Feb. 21, 1961 J. L. MANZOLILLO 2,972,382
MARINE PROPELLER
Filed June 4, 1958 3 Sheets-Sheet 1

INVENTOR.
JAMES L. MANZOLILLO
BY
Moore, White & Burd
ATTORNEYS

Feb. 21, 1961 J. L. MANZOLILLO 2,972,382
MARINE PROPELLER
Filed June 4, 1958 3 Sheets-Sheet 2

INVENTOR.
JAMES L. MANZOLILLO
BY
ATTORNEYS

Feb. 21, 1961 J. L. MANZOLILLO 2,972,382
MARINE PROPELLER

Filed June 4, 1958 3 Sheets-Sheet 3

INVENTOR.
JAMES L. MANZOLILLO
BY
ATTORNEYS

United States Patent Office 2,972,382
Patented Feb. 21, 1961

2,972,382
MARINE PROPELLER
James L. Manzolillo, Peoria, Ill.
(Rio Balsas 10A, Mexico City 5, Mexico)
Filed June 4, 1958, Ser. No. 739,750
10 Claims. (Cl. 170—159)

This invention relates to improved marine propellers and to the method of making them. More particularly, this invention relates to improved propellers for marine vessels of the type, such as commercial fishing boats, for example, which are desired to be operated efficiently at different higher and lower running speeds and to the method of making such propellers.

The majority of fishing boats in commerical use are vessels ranging from about 40 to 75 feet in length requiring from about 100 to 300 horsepower. The majority of these boats are based in a home port some distance from their fishing grounds so that the average fishing boat must travel from 20 to 300 miles or more before it may begin fishing. The time consumed in traveling to and from the fishing grounds produces no direct income to the fisherman. It is desirable, therefore, that the vessel travel at top speed or its maximum "free running" speed while on its way to the fishing grounds and when returning to port. For the majority of commercial fishing vessels the free running speed averages between about 7 to 15 miles per hour.

After the desired fishing spot has been located the vessel then slowly drags or tows nets for the fish. On the average, these nets range from about 75 to 135 feet wide. If the nets are towed too fast, they tend to float or lift off the bottom. For this reason, the normal towing speed of a fishing vessel is between about 3 to 4 miles per hour. In order to maintain this desired low towing speed, the average of 1600 to 1800 r.p.m. marine engine speeds must be reduced to a speed low enough so that the power output maintains the desired low speed. In order to maintain this desired low towing speed the propeller r.p.m. has to be reduced considerably and if the propeller design is not adequate for this purpose, its efficiency falls to its minimum. When operating the engine at this towing speed it is highly desirable to operate the engine at the lowest speed possible to minimize fuel consumption as well as wear and tear on the equipment. The particular design of the blades of the propeller used on the boat may have much to do with determining the success of each round trip to the fishing or shrimping grounds.

It is customary for a fishing vessel to stay out of port towing nets at the fishing ground till an economic catch has been made. It is usual for shrimp boats, for example, to stay out 6 or 7 days up to from 10 to 15 days at a time, towing nets at low speed for most of the time. The success of commercial fishing or shrimping may be dependent to a large extent upon such factors as the efficiency of the vessel's propeller. The time consumed in propelling the boat to and from the fishing grounds may materially affect the time allowed for towing the nets to gather in the catch.

If the design of the propeller is such that the engine must be operated at relatively high speeds to maintain the proper towing speed, fuel consumption is proportionately increased and greater wear and tear of the equipment results, all of which increases the operating costs. Speed may also become an important factor in completing each trip to and from the fishing grounds, particularly if the craft must rely upon the use of ice as a coolant for preserving its pay load or catch until it returns to its base port or unloading dock. When operating a fishing or shrimping boat utilizing ice as a coolant, the supply of ice carried on the craft may determine to a large extent the duration of each trip to and from the fishing grounds.

The propeller for use on fishing vessels should therefore be selected for good efficiency at both free running and towing speeds. Theoretically, the most efficient propeller would be one designed for either free running or for towing. Since maximum efficiency cannot be expected for both conditions in a single propeller, it has been the usual practice to select a compromise propeller which operates satisfactorily at both high free running speed and low towing speed, but not as satisfactorily as a propeller selected specifically for either of these conditions. It has now been discovered that the efficiency of a marine propeller may be increased at both free running and low towing speeds by providing the working or thrust faces of the blades of the propeller with a spooned or concave shape formed according to a predetermined design or pattern.

It is an important object of the present invention to provide a new and improved marine propeller which is so designed that it may be efficiently operated at free running or maximum engine speed, and which is equally efficient when operated at low towing speeds.

It is a further object of this invention to provide an improved marine propeller having concave working faces whose curvature is predetermined by the diameter and rake angle of the propeller.

Other objects of the invention will become apparent as the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invetnion may be employed.

The invention is illustrated by the drawings in which the same numerals refer to corresponding parts and in which.

Figure 1:
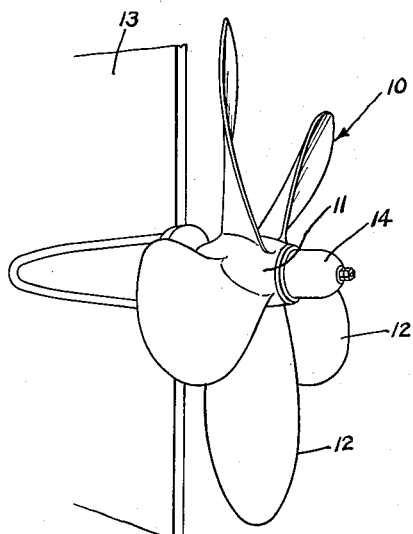
Figure 1 is a perspective view of a five-bladed marine propeller whose blades are shaped according to the present invention.

Referring to the drawings, in Figure 1 there is shown a perspective view of a five-bladed marine propeller according to this invention, indicated generally at 10. The propeller 10 comprises a hub 11 having a plurality of blades 12 and is keyed to the end of a drive shaft extending through the hull portion of a ship 13. The propeller is secured to the end of the shaft and preferably provided with a cap 14 or similar means. The blades 12 are disposed evenly about the central hub extending radially outwardly and pitched at an angle as is well understood in the art. Although a five-bladed propeller is illustrated, it will be understood that the principles of the invention are equally applicable to any marine propeller having a plurality of blades whether there be two, three, four, five or more.

Broadly stated, the invention resides in the provision of a marine propeller having a plurality of blades whose working or thrust faces are concave having uniform curvature generated by the circular arc of a pendulum swung in adjacent planes defined by the axis of rotation of the propeller and radii of the propeller, the length of the pendulum being the function of the propeller diameter and rake angle. Rake angle represents the degree of deviation of the radial center line of the face of a propeller blade from normal.

Figure 2:
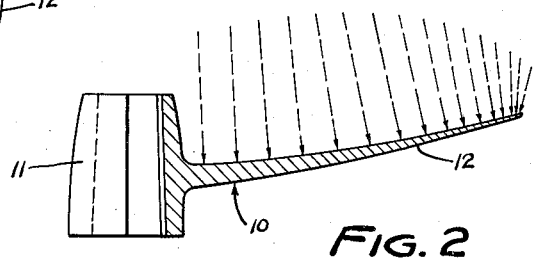
Figure 2 is a radial section through one blade of a propeller according to this invention and showing diagrammatically the thrust load upon the blade.
Figure 3:
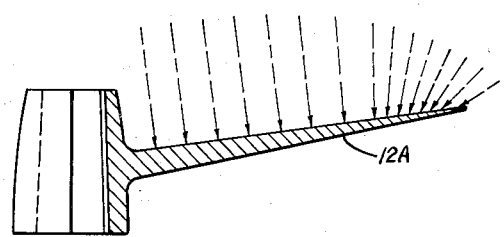
Figure 3 is a comparative radial section through a blade of a conventional marine propeller showing diagrammatically the thrust load upon such a conventional blade.

Comparison of Figures 2 and 3 shows the differences in effect of thrust load on the curved face blade 12 formed according to this invention as compared with a more conventional flat face blade 12A. It will be noted in Figure 2 that the blade having curved rake reduces water deflection at the blade tips resulting in concentrated thrust on larger blade area due to the funnelling action caused by the curvature. In contrast, it will be noted that the thrust load on the more conventional blade having straight rake is reduced at the blade tip due to vortex action influenced by blade shape and centrifugal force of the water in action. This blade tends to direct the water toward the tips of the blades so that the water is forced outwardly over a turbulent area having a diameter much larger than the propeller itself.

The curved face blade of Figure 2 reduces the whirling action of the water and limits the whirling of water to a smaller area. The water is directed backwards in a more concentrated area because the push on the blades is toward the propeller center from any point in the blade surface. The centrifugal force of the water acting on the curved blade tends to direct the water in a stream to the rear of the propeller in a funnelled and controlled pattern eliminating eddy currents and turbulence at the tips of the blades and eliminating wasted energy.

Figure 5:
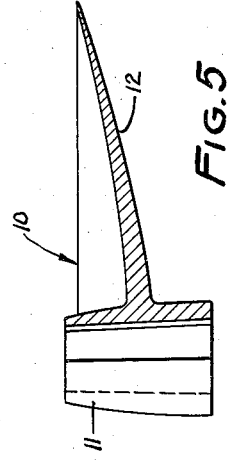
Figure 5 is a radial section through one blade of a multi-bladed marine propeller taken on the line 5—5 of Figure 4 and in the direction of the arrows.
Figure 7:
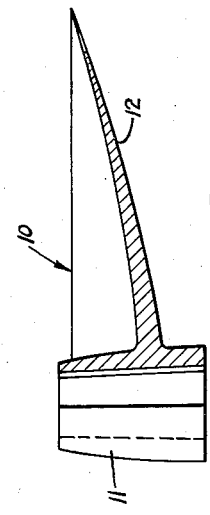
Figure 7 is a similar radial section through one blade of a propeller taken on the line 7—7 of Figure 4 and in the direction of the arrows.
Figure 4:
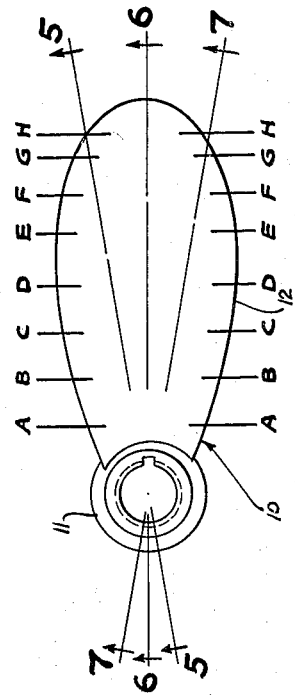
Figure 4 is a plan view of the hub and one blade of a multi-bladed marine propeller according to this invention.
Figure 8:
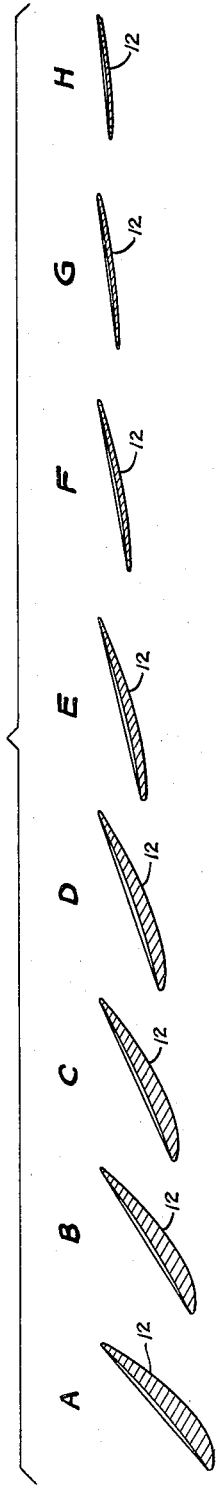
Figure 8 shows a plurality of transverse sections through one blade of a propeller as taken, respectively, on the lines A—A through H—H of Figure 4.

Referring to Figure 4, there is shown a plan view of one blade of a multi-bladed marine propeller formed according to this invention. In each of Figures 5, 6 and 7, there is shown a radial section through the blade of Figure 4 taken, respectively, on the lines 5—5 through 7—7 of that figure. It will be noted that in each instance, the radius of curvature of the blade lengthwise from hub to blade tip is the same. As explained in greater detail hereinafter, this curvature is obtained by machining the blade with a rotary cutter held at the end of a long lever or pendulum connected to a fulcrum located a definite and calculated distance from the blade as determined by the specific propeller dimensions. Figure 8 shows a plurality of transverse cross sections through the blade taken on the lines A—A through H—H of Figure 4. It will be noted that the propeller blade gradually changes from ogival section at the tip to airfoil section at the base or root section adjacent to the hub.

It has been found that the ogival section is useful in practically every installation and it is especially useful in highly loaded propellers in the range of cavitation. The airfoil section, while developing high thrust, has a tendency to vibrate and break down in cavitation when highly loaded. However, in the root section of the propellers where the velocities of rotation are small, modern trend is to use airfoil section, gradually changing to ogival section at the tip where the velocity is high, thus increasing the efficiency of the propeller. It might be added, however, that these increases in efficiency are of small order seldom exceeding 3 or 4 percent. The most efficient propeller is the one that produces the greatest amount of thrust for the least amount of torque. Increased efficiencies of 15 to 20 percent or more have been obtained by the use of marine propellers having blades whose curvature is formed according to the principles of this invention.

Figures 9, 10, 11:
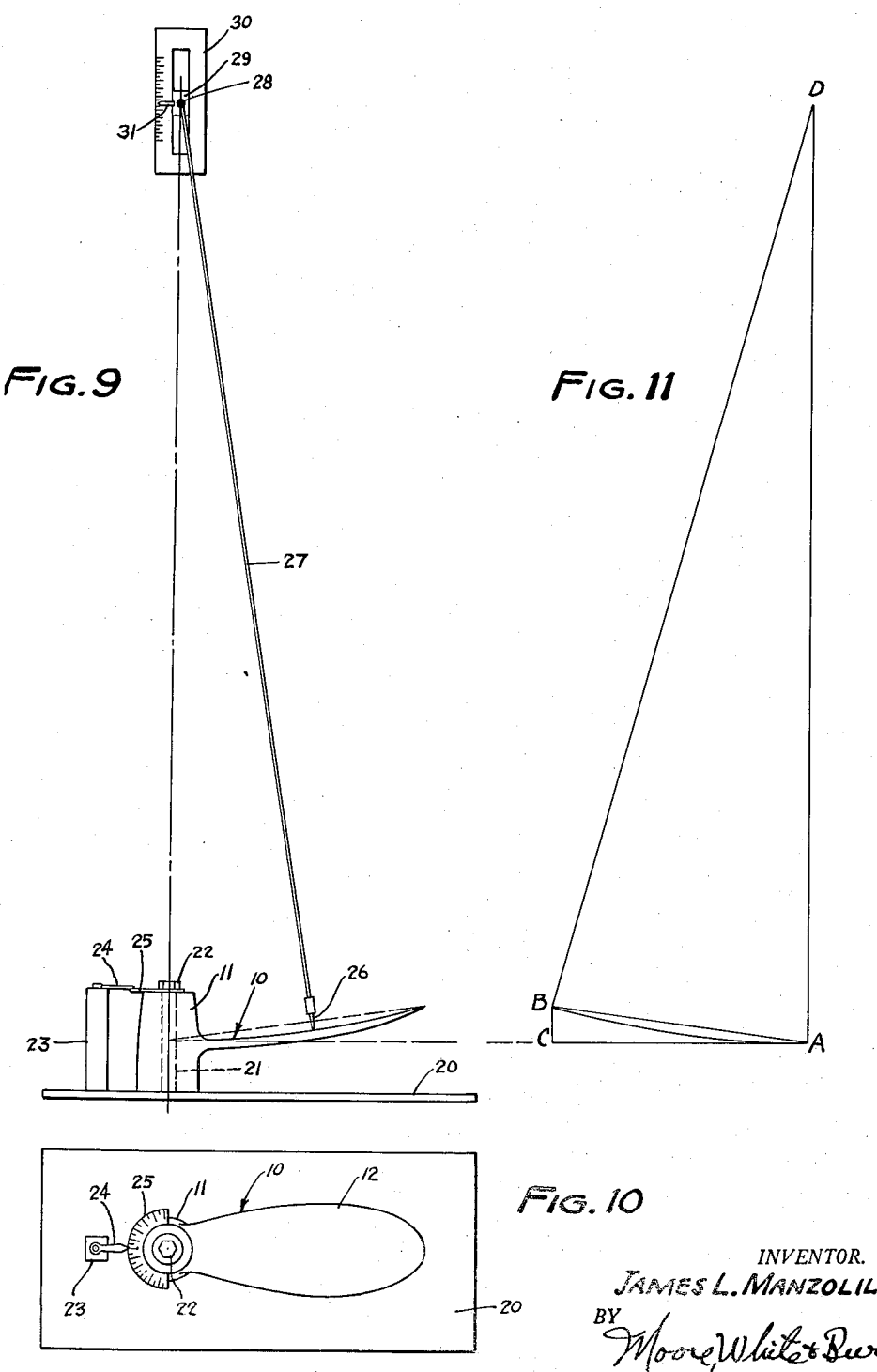
Figure 9 is an elevation of means for producing the desired blade curvature according to this invention.
Figure 10 is a top plan view of one blade of a marine propeller held in a jig for production of the desired curved surface.
Figure 11 is a diagrammatic representation of the relationships among propeller diameter, rake angle and arc of curvature of the blades.

Referring to Figures 10 and 11, there is shown means by which a marine propeller is provided with the desired blade curvature. The propeller is mounted on a jig including a base 20 and a spindle 21 upon which the hub of the propeller is mounted and held fast by a nut 22 or equivalent fastening means. The jig is provided with a standard 23 about equal in height to the propeller hub 11 and provided with a pointer 24. A protractor guide plate 25 is secured to the propeller hub to facilitate movement of the propeller for machining. As illustrated, the center zero point of the protractor 25 is aligned with the pointer 24 and the radial center line of the blade 12. This arrangement is feasible since a pattern for only one blade need be generated by my method and the other blades may be copied from it.

A rotary electrically driven cutter 26 is disposed at the end of a pendulum 27 whose fulcrum 28 is positioned in a vertically slidable support 29 mounted in a stationary slideway 30. The fulcrum support is provided with means for securing it at different desired positions within the slideway 30 and is provided with a pointer 31 which, in cooperation with graduations on the slideway, facilitates accurate positioning of the fulcrum. The fulcrum 28 is located on an extension of the axis of rotation or center line of the propeller hub. The pendulum 27 is of variable length and movable in a vertical plane defined by the axis of rotation of the propeller and by any radius of the propeller. In the illustrated embodiment the defining radius is at the radial center line of the blade 12. It will be understood that the plane in which the pendulum 27 moves remains the same, but that, as the propeller is rotated upon the spindle, the defining radius will change. The lengthwise curvature of the propeller blades from hub to tip is in the form of a plurality of circular arcs of constant radius which is the function of the diameter and rake angle of the propeller.

The length of the pendulum and the location of the fulcrum are determined from the specific propeller dimensions. The principal propeller dimensions are diameter, pitch and rake angle. The rake angle is represented as a percentage of the propeller diameter. This value has definite limitations depending upon the particular application. In general, this value will vary between about 4 and 8 percent. For commercial fishing vessels using three, four, and five bladed propellers, a rake angle of about 7 percent has been found to give the greatest efficiency in performance.

Referring to Figure 11, the line AD represents the vertical center line of the hub 11 of a propeller, or the axis of rotation of the propeller. Point D is the location of the fulcrum 28 and line BD represents the length of the pendulum 27 from the fulcrum to the tip of the rotary cutter 26. The line AC represents the radius, or one-half of the diameter, of the propeller. The distance BC represents the rake expressed as a percentage of the propeller diameter. Thus, for example, if the diameter of the propeller is 54 inches the rake is calculated as 7 percent of 54, or 3.78 inches. The triangle ABC is a right triangle and, since the lengths of lines AC and BC are known, the rake angle BAC can be calculated in degrees by simple trigonometry.

Figure 6:
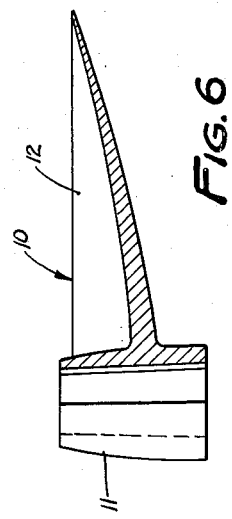
Figure 6 is a similar radial section taken along the radial center line 6—6 of one blade of a marine propeller as shown in Figure 4 and in the direction of the arrows.

The length of line AB, which is a chord subtending the desired arc, can readily be calculated since it is the hypotenuse of a right triangle whose other sides are known. The desired circular arc AB has a radius of curvature equal to AD or BD. Since AD and BD represent equal radii, the triangle ABD is obviously an isosceles triangle. Therefore, angles BAD and ABD must be equal. Angle BAD is equal to 90 degrees minus the rake angle BAC in degrees. The subtended angle ADB can readily be calculated by subtracting the sum of the two base angles of the isosceles triangle from 180 degrees. Knowing the length of the chord AB subtending the angle ADB as well as that angle, the length of radii AD and BD can readily be calculated. The position of the fulcrum for making the cut along the radial center line of the face of the propeller blade is thereby determined. This represents the zero point setting for the slidable support 29. After this first cut is made, defining the curvature of the blade along the centerline of the face of the face of the blade, as shown in Figures 6 and 9, the propeller is rotated on the jig spindle a predetermined distance measured in degrees on the protractor 25.

Because of the pitch of the propeller blades, the location of the pendulum fulcrum must be moved upwardly if the propeller is rotated in a clockwise direction or downwardly if the propeller is rotated in a counterclockwise direction for a propeller with right hand pitch, and just the opposite for a left hand propeller. The length of the pendulum, however, remains constant for any given propeller. To determine the amount of upward or downward displacement of the fulcrum, the pitch of the propeller in inches is divided by the number of degrees in a full circle. Thus, for example, in the case of a propeller having a pitch of 36 inches, for each degree the propeller is rotated from the zero point at the radial center line of the blade face the fulcrum point 28 must be displaced by one-tenth of an inch.

The propeller is rotated in small increments and the location of the pendulum fulcrum is moved vertically in corresponding proportional increments, as determined by the pitch of the propeller blades, until the required number of radial cuts have been made by the rotary cutter 26 to provide each blade with the desired curved face. At the same time each blade face is automatically provided with a transverse curvature defined by the plurality of radially displaced lengthwise curves. Thereafter, the blade is finished by smoothing out the blade surface. The thickness of the blade and the final outlines of the blade are determined as dictated by standard practices considering the balance of the propeller, strength of materials used, etc.

Although the generation of the working face curvature has been described with reference to a marine propeller itself, it will be understood that in accordance with usual practice the curvature would most generally be generated in a pattern of more readily workable material, such as wood, and that propellers having the desired structure would then be cast in a mold made from that pattern and finished, all in accordance with conventional practice. The result is the same in either instance.

As a typical example of the calculations made to determine the radius of curvature of the working faces of the blades, we may assume a propeller of 54 inch diameter, 36 inch pitch and 7 percent rake. Seven percent of the diameter is 0.07 times 54 and equals 3.78 inches, or the lift of the blade tip from the blade face at the base of the blade. From the standard formulas for the solution of a right triangle, we know that the tangent of rake angle BAC (Fig. 11) is equal to the distance BC divided by the distance AC, or 3.78 divided by 27, which equals 0.14. By reference to a table of natural trigonometric functions, we find that this represents an angle of 7 degrees 58 minutes, which for purposes of this example, we shall consider as 8 degrees, the rake angle in degrees. It will then readily be seen that the fulcrum angle ADB is equal to twice the rake angle in degrees. Angle BAD equals a right angle less the rake angle, or 82 degrees. Angle ABD being the other base angle of an isosceles triangle is likewise equal to 82 degrees and the fulcrum angle ADB equals 180 degrees minus twice 82 degrees, or 16 degrees.

The chord AB subtending the desired arc of curvature and the angle ADB is the hypotenuse of the right triangle ABC, two of whose sides are known, and can readily be calculated as 27.26 inches. Using the standard formula which defines the length of a chord subtending an angle as being equal to twice the radius multiplied by the sine of one-half of that angle, we find that 27.26 divided by the sine of one-half of the subtending angle (sine 8 degrees equals 0.139) equals twice the radius, or twice the pendulum length represented by the distance BD. Working this out we find that twice the radius equals 195.4 inches and that the radius of lengthwise curvature for the blade faces is 97.7 inches. This determines the radius of curvature by determining the length of the pendulum and fixes the location of the pendulum fulcrum for the cut to be made along the radial center line of the blade.

For the right hand propeller of this example having a pitch of 36 inches, for each degree the propeller is turned in a clock-wise direction, the fulcrum point is raised by one-tenth of an inch (36 inches divided by 360 degrees) for each of the propeller blades. It will be understood that the zero point for each blade will be the same and that the fulcrum is reset for each blade. In addition to creating the radial blade curvature as exemplified in Figures 5, 6 and 7, a spontaneous transverse curvature is imparted to the blade, as exemplified by the sectional views of Figure 8.

The propellers embodying the principles of this invention are especially adapted for vessels of the size of commercial fishing vessels ranging from about 40 to 75 feet in length and using propellers in excess of about 24 inches in diameter, or for vessels of any size, providing that the r.p.m. of the propeller is on the medium range and also for large vessels that have their r.p.m. of the propeller in the low speed range. Comparative tests were made by substituting marine propellers according to this invention for the standard commercial propellers of the same diameter and pitch theretofore used. It was found that up to one mile per hour was added to the running speed, an increase of from about 6½ to 15 percent, and when towing the same size nets at the same reduced boat speed as previously, the engine speed could be further reduced by about 15 to 20 percent with the same trawling results. This definite increase in propeller efficiency, which is attributable to the curved blade face design, means that larger nets can be towed at the engine speeds previously used or, at reduced engine speeds longer engine life and lower fuel consumption will result.

It is apparent that many modifications and variations of this invention as hereinbefore set forth may be made without departing from the spirit and scope thereof. The specific embodiments described are given by way of example only and the invention is limited only by the terms of the appended claims.

I claim:

1. A marine propeller comprising a hub, a plurality of pitched blades secured at one end to said hub and extending radially therefrom, said blades being spaced evenly about the hub, the working face of each blade being disposed at a positive rake angle and being curved lengthwise along radii extending from the hub to the tip of the blades in the form of a circular arc, the radius of which is a function of the diameter and rake angle of the propeller.

2. A marine propeller according to claim 1 further characterized in that the center of said arc of curvature lies on the axis of rotation of said propeller.

3. A marine propeller comprising a central hub and a plurality of pitched blades secured at one end to said hub and extending radially therefrom, said blades being spaced evenly about the hub, the working face of each blade being disposed at a positive rake of between about 4 and 8 percent of the diameter of the propeller and being concavely curved, the circular arc of curvature of said working faces as measured lengthwise along the radii of said propeller being constant and lying along the line generated by the tip of a pendulum of constant length moved in successive radial planes.

4. A marine propeller according to claim 3 further characterized in that the center of the circular arc of curvature of each of said blades lies on the axis of rotation of said propeller.

5. A propeller according to claim 3 further characterized in that the lengthwise radial arc of curvature of each of said blades is that arc whose chord subtends an angle which is twice the rake angle of the propeller blades expressed in degrees.

6. A marine propeller according to claim 3 further characterized in that said rake angle is about 7 percent of the diameter of said propeller.

7. A propeller according to claim 1 further characterized in that said propeller has from 3 to 6 blades evenly distributed about said hub.

8. A marine propeller comprising a hub, a plurality of pitched blades secured at one end to said hub and extending radially therefrom, said blades being uniformly disposed about the circumference of the hub, the working face of each of said blades being disposed at a positive rake and being concavely curved, the lengthwise curvature of each of said blades being in the form of a circular arc lying in the working face of said blades as measured along radii of said propeller, the radius of curvature of each of said circular arcs being constant, the center of said circular arcs lying along the axis of rotation of said propeller, and the chords of said arcs subtending an angle which is equal to two times the rake angle expressed in degrees.

9. A marine propeller according to claim 8 further characterized in that the working face of each of said propeller blades is concavely arcuate transversely of said blades, said transverse curvature being generated by the plurality of circular arcs of constant radius radially displaced proportionately to the pitch of said propeller blades.

10. A marine propeller according to claim 8 further characterized in that said propeller is provided with from 3 to 6 blades and said rake is about 7 percent of the diameter of the propeller.

References Cited in the file of this patent

UNITED STATES PATENTS

| | | |
|---|---|---|
| 384,498 | Bartlett | June 12, 1888 |
| 914,857 | Miller | Mar. 9, 1909 |
| 2,092,030 | Soules | Sept. 7, 1937 |

FOREIGN PATENTS

| | | |
|---|---|---|
| 400 | Great Britain | July 20, 1882 |
| 83,066 | Germany | Sept. 9, 1895 |